(12) United States Patent
Cornelissen et al.

(10) Patent No.: US 8,212,948 B2
(45) Date of Patent: Jul. 3, 2012

(54) TWO AND THREE DIMENSIONAL VIEW DISPLAY

(75) Inventors: Hugo J. Cornelissen, Waalre (NL); Martinus H. W. M. Van Delden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 821 days.

(21) Appl. No.: 11/719,234

(22) PCT Filed: Nov. 7, 2005

(86) PCT No.: PCT/IB2005/053642
§ 371 (c)(1),
(2), (4) Date: Feb. 4, 2009

(87) PCT Pub. No.: WO2006/054197
PCT Pub. Date: May 26, 2006

(65) Prior Publication Data
US 2009/0295689 A1 Dec. 3, 2009

(30) Foreign Application Priority Data
Nov. 18, 2004 (EP) .................................... 04105898

(51) Int. Cl.
*G02F 1/13357* (2006.01)
*G02B 27/26* (2006.01)
*H04N 13/00* (2006.01)
(52) U.S. Cl. ......... 349/15; 349/65; 349/96; 359/485.01; 362/606
(58) Field of Classification Search .................... 349/15, 349/61, 65, 96; 359/462, 465, 495, 496, 359/464, 485.01, 489.01; 345/102; 348/54, 348/58; 362/606, 607
See application file for complete search history.

(56) References Cited

U.S. PATENT DOCUMENTS

| 4,588,259 | A | 5/1986 | Sheiman |
| 5,812,186 | A | 9/1998 | Telfer et al. |
| 6,300,986 | B1 | 10/2001 | Travis |
| 2003/0058383 | A1* | 3/2003 | Jagt et al. .................. 349/65 |
| 2004/0041747 | A1 | 3/2004 | Uehara et al. |

FOREIGN PATENT DOCUMENTS

| EP | 0829744 | 3/1998 |
| WO | 2004070451 | 8/2004 |
| WO | WO 2004/088996 | * 10/2004 |

* cited by examiner

*Primary Examiner* — Dung Nguyen
*Assistant Examiner* — Tai Duong
(74) *Attorney, Agent, or Firm* — Larry Liberchuk (57) ABSTRACT

A display device (200) configured to provide two-dimensional and three dimensional perception. The device comprises a display panel (230), a backlight arrangement (201) and control circuitry (232). The backlight arrangement comprises a first layer (210) in the form of an optically clear lightguide, a birefringent second layer (202) and a third layer (204). At least one interfacing surface between any two of the layers comprises a microstructure (206) in the form of a plurality of essentially parallel structures extending in a direction of extension (x) of the structures. The device further comprises first (218) and second (219) light sources that are configured to emit light into the lightguide in a first (z) and a second direction (-z), respectively. The first and second directions are essentially opposing directions and the first and second directions are essentially perpendicular to the direction of extension of the microstructure.

15 Claims, 6 Drawing Sheets

TWO AND THREE DIMENSIONAL VIEW DISPLAY

TECHNICAL FIELD

The present invention relates to a display device configured to provide two-dimensional and three-dimensional perception and in particular to a display device and a method of controlling a display device that is capable of switching between a two-dimensional and a three-dimensional mode.

BACKGROUND

The use of display systems that provide three-dimensional perception is becoming more widespread, much due to the rapid increase of computing speed of graphic processing systems. For example, even a typical personal computer is capable of providing image processing power that is enough to provide a virtual three-dimensional view on a typical matrix display device.

However, in order to provide a more lifelike three-dimensional view it is desirable to provide a display that is capable of providing a parallactic effect. This problem has been attacked in many different ways during many previous decades, one example being that of using a combination of specifically configured glasses, e.g. two-coloured or polarizing, and specifically configured display devices. Other systems have involved the use of display panels that are arranged with an extended lens system that covers the display panel and provides the parallactic effect.

A drawback with many of these prior art solutions is that they are not capable of providing an easy way of switching between a normal two-dimensional viewing mode and a three-dimensional viewing mode, while maintaining image resolution and multi colour capability. Usually, switching between the two viewing modes have involved exchanging one display device for another. Needless to say, such a solution is both complicated and expensive.

A prior art apparatus that is capable of switching between two-dimensional and three-dimensional image presentation is described in US patent application publication 2004/0041747 A1. Two lenticular lenses are arranged in front of a matrix display panel. By shifting the relative position between the two lenses, the view of picture elements of the matrix display can be switched between a two-dimensional mode and a three-dimensional mode. A drawback, however, of the arrangement described in US patent application publication 2004/0041747 A1 is that it is mechanically complex, at least by the fact that it involves moving parts.

SUMMARY OF THE INVENTION

It is hence an object of the present invention to overcome the drawbacks of prior art arrangements and to provide a simple way in which a display device can provide switching between a two-dimensional and a three-dimensional viewing mode.

The object is achieved by way of a display device according to claim 1 and methods of controlling a display device according to claim 14 and 15.

That is, according to a first aspect, the invention is a display device configured to provide two-dimensional and three-dimensional perception. The device comprises a display panel, a backlight arrangement and control circuitry. The backlight arrangement comprises an optically clear lightguide having
a first side face for coupling into the lightguide light traveling in a first direction within the lightguide,
a second side face, opposite the first the side face, for coupling into the lightguide light traveling in a second, opposite the first direction within the lightguide;
an exit surface via which light coupled into the lightguide is coupled out the lightguide.

The backlight arrangement further comprises a relief-structured polarization-selective beam-splitting interface for splitting-off from the light traveling in the first direction, a first beam of first polarization and redirecting said first beam to have said first beam exit the exit surface at a first angle and for splitting-off from the light traveling in the second direction, a second beam of light of first polarization and redirecting said second beam to have said second beam exit the exit surface at a second angle different from the first angle; and the control circuitry is configured to provide the three-dimensional perception using the first and the second beam.

A particular embodiment comprises a first layer in the form of an optically clear lightguide, a second layer and a third layer. At least one interfacing surface between any two of the layers comprises a microstructure in the form of a plurality of essentially parallel structures extending in a direction of extension of the structures. The device further comprises first and second light sources that are configured to emit light into the lightguide in a first and a second direction, respectively. The first and second directions are essentially opposing directions and the first and second directions are essentially perpendicular to the direction of extension of the relief structure.

The light emitted from each one of the first and second light sources (or single light source of which light is directed to first and second side face) are subject to internal reflections and, when reflected into the second layer via the relief structure, separates into two beams of light having different directions of polarization. That is, a first beam of light having a first direction of polarization and a first beam direction, and a second beam of light having a second direction of polarization and a second beam direction. The first beam exits the backlight device along the first beam direction and the second beam remains trapped within the backlight device until recycled.

Hence, due to the fact that the first light source and the second light source emit light into the lightguide along essentially opposing directions, two beams of light will be emitted from the backlight, each beam of light having a respective beam direction. When passing through the display panel, e.g. an active matrix LCD panel, where graphical information is present, the two beams will bring to a viewer a three-dimensional perception of the graphical information of the display panel.

In the case that both lamps are operated at the same time, or operated in an alternating manner to save power, the three-dimensional viewing mode is enabled. By operating only one lamp, the two-dimensional viewing mode is enabled. Thus a 2D and a 3D operating mode can be integrated into one and the same backlight module, where switching between the two viewing modes is performed by a simple switching one of the lamps off or on.

An advantage of the present invention is hence that the display device does not suffer from resolution loss in 2D mode. The full 2D resolution is used for the right and for the left eye. The 3D image impression is built-up by time sequentially showing the right-eye and the left-eye image, synchronised with the backlight that switches between sending light to the right eye and to the left eye.

Another advantage of the invention is that it is simple to realize and hence inexpensive. This in contrast to prior art arrangements that, e.g., involve mechanically moving lens systems that are difficult and hence expensive to implement.

The second layer may in preferred embodiments be birefringent, i.e. optically anisotropic. However, the second layer may in other embodiments have a refractive index that is higher, e.g. significantly higher, than the refractive index of both the first layer and the third layer. This is advantageous in that it is easy, and hence non-expensive, to manufacture.

In preferred embodiments, the first layer and the second layer is joined into a single layer. This is advantageous in that it makes the backlight compact in size.

Preferably, the relief structure comprises grooves that extend into the relief structured surface and a cross-section of the grooves is preferably symmetric, for example triangular, with respect to a direction perpendicular to the direction of extension of the grooves.

In a preferred embodiment, the birefringent second layer comprises a PolyEthyleneNaphthalate (PEN) foil. In another preferred embodiment, the birefringent second layer comprises a PolyEthyleneTerephthalate (PET) foil.

In preferred embodiments, using a triangular shape of a cross-section of the grooves, a width and a depth of the grooves define a groove angle and where the groove angle is in the interval 30° to 90°. More preferably, the groove angle is in the interval 30° to 70°.

According to a second aspect of the present invention, a method of controlling a display device as described above, comprises controlling the light coupling into the light guide via the first and second side face to be continuous in time. Alternatively, controlling the light coupling into the light guide via the first and second side face is such that light incoupling is alternate between the first and second side face at an alternation rate high enough not to be perceivable by a human viewer. An advantage of such alternating operation is that is power saving and hence suitable for use in portable devices such as laptop computers, mobile telephones etc.

BRIEF DESCRIPTION OF THE DRAWINGS

FIG. 2b illustrates schematically a combination of a block diagram and cross section of a preferred embodiment of the display device according to the present invention in FIG. 2a.

PREFERRED EMBODIMENTS

Figure 1:
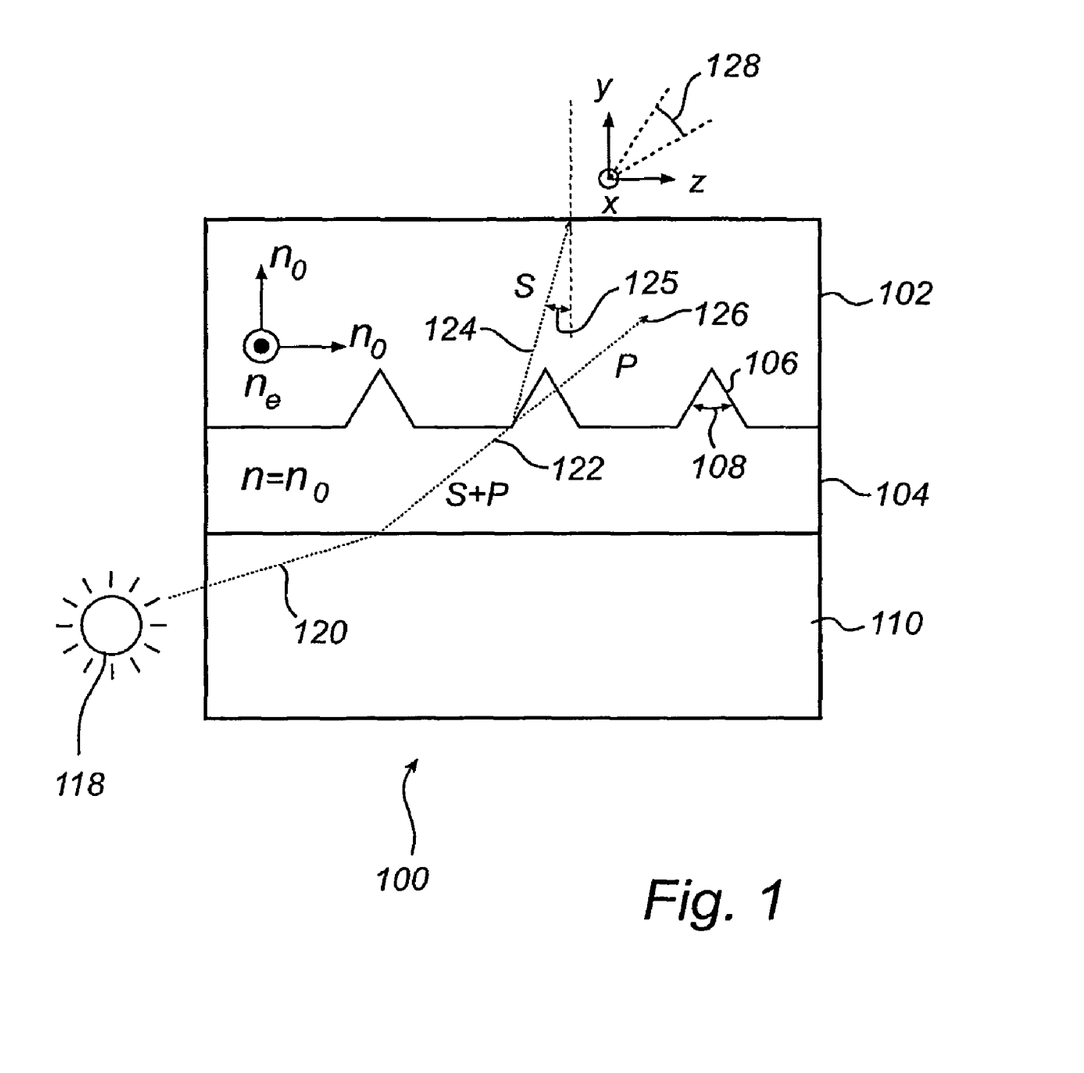
FIG. 1 illustrates schematically a backlight used in a preferred embodiment of the present invention.

The description of the preferred embodiments of the invention will commence, referring to FIG. 1, with a brief description of a polarized backlight 100. A polarized backlight 100 is capable of converting light 120 of two different polarisation directions, S and P, into light of only one polarisation direction (S), which is emitted in a direction 124 towards a display panel, e.g. an LCD panel (not shown in FIG. 1).

The backlight 100 is made from an optical anisotropic material layer 102, i.e. birefringent, and a layer of an optical isotropic material 104. The refractive indices of the two layers are indicated in FIG. 1. The refractive index of the isotropic layer 104 is $n_o$ and the indices along the principal directions x, y and z of the anisotropic layer 102 are $n_e$, $n_o$ and $n_o$, respectively.

In the anisotropic layer 102 a relief structure in the form of microgrooves 106 are fabricated by machining, embossing or other patterning technologies. These grooves 106 are covered with the isotropic material 104 to form a light guide and is supported by a poly (methyl methacrylate), i.e. PMMA, backing layer 110, which receives light 120 from a light-source 118, i.e. a lamp.

The light 120 comprising light of the desired polarisation direction (S) hits the grooves 106 and is reflected outwards as S light 124 in a direction 125 due to the fact that the refractive indices of the two interfacing layers 102 and 104 are in mismatch. For light 126 of the other polarisation direction (P) the refractive indices match and, hence, P light 126 remains trapped by total internal reflection. Thus the P light 126 can be recycled in the backlight 100 until it flips polarisation direction through reflection/collision. The intensity of the emitted S light 124 may hence be as much as twice as large as that of a conventional backlight.

An important feature of the polarising backlight 100 are its grooves 106. As shown in FIG. 1, the emitted polarised light 124 exits the backlight 100 under a given angle 125, and because of the shallow incident angles in total internal reflection mode, the emitted light 124 is also collimated to a certain extent, that is the S light 124 is distributed over an angular interval 128 that spans some 15-20 degrees. Although the angular distribution 128 of the emitted collimated light 124 is difficult to change (i.e. narrow), the emission angle 125 may be changed quite easily. This can simply be done by varying the angle 108 of the grooves in the anisotropic material 102. Thus the light may be emitted at almost any (pre-fixed) angle. Results from computer modelling where the groove angle dependence of the emitted light is explored will be presented below.

Figure 2A:
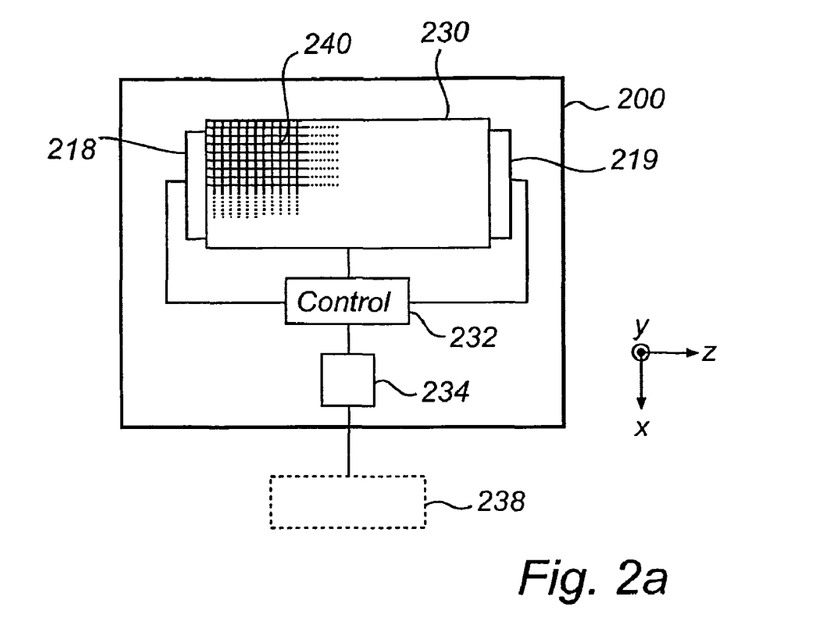
FIG. 2a illustrates schematically a block diagram of a preferred embodiment of a display device according to the present invention.
Figure 2B:
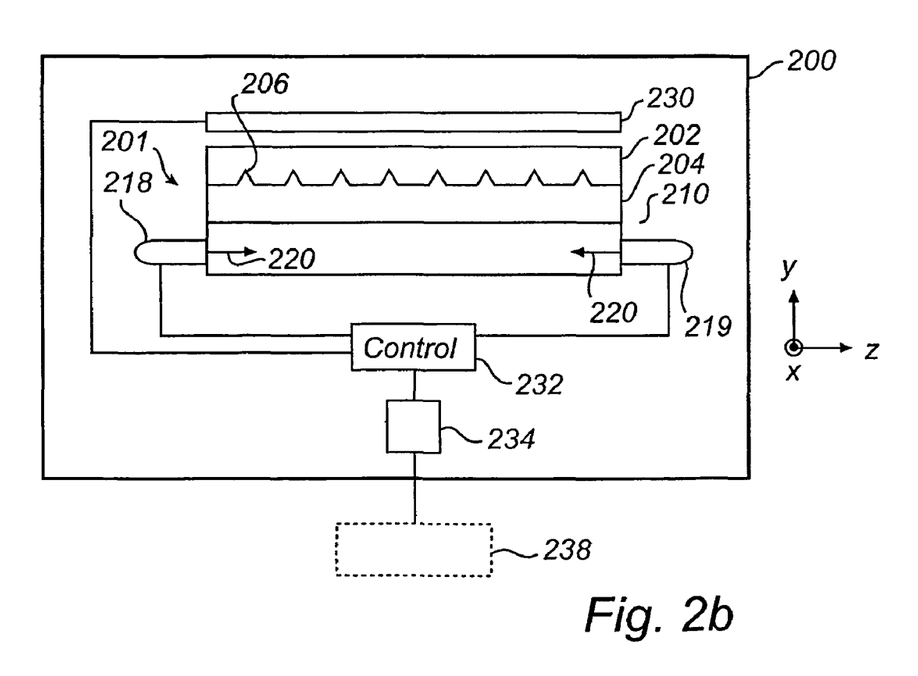

Turning now to FIGS. 2a and 2b, a block diagram of a preferred embodiment of a display device 200 according to the present invention will be described. The display device 200 comprises a matrix LCD panel 230 on which a number of picture elements 240 are indicated. The LCD panel 230 is illuminated by a backlight 201.

A control unit 232 controls the display of information, e.g. information received via an interface 234 from an external source 238, on the LCD panel 230. The control unit 232 also controls a first light source 218 and a second light source 219 in the backlight 201 that emit light in opposing directions, z and -z respectively, in a lightguide 210. As already described above in connection with FIG. 1, the light from the light sources 218, 219 travel via the lightguide 210 and is subject to reflection and refraction in an isotropic layer 204 and a birefringent (anisotropic) layer 202 that comprises a plurality of parallel V-shaped grooves 206.

Continuing now with reference to a cross-sectional view in FIG. 3, a description of a backlight 300 will be given. The backlight 300 is, for example, usable in the display device 200 described above. The backlight 300 comprises a first light source 318 and a second light source 319. The light sources 318, 319 emit unpolarized light into a birefringent lightguide 302, which is arranged on top of an optically isotropic layer 304. The lightguide 302 is configured with a plurality of symmetric, with respect to a line 309 along a direction y, V-shaped parallel grooves 306. The grooves 306 have a width and depth that in combination defines a groove angle 308. Light emanating from the first light source 318 is exemplified by a first light path 330 and a second light path 332. Light emanating from the second light source 319 is exemplified by a third light path 334 and a fourth light path 334. The light sources 318, 319 may be operated continuously or alternating at high frequency, i.e. high enough not to be noticed by the human eye.

As will be illustrated below in the presentation of computer modelling results, the symmetric grooves 306 have an angle 308 that is preferably larger than 30 degrees and smaller than 70 degrees, yet, not limited to these angles. For example, for larger groove angles 308 a disturbing secondary beam may arise, having reduced intensity. This beam may, however, be used to create multiple (e.g. two) views.

Continuing now with reference to a cross-sectional view in FIG. 4, a description of another preferred embodiment of a backlight 400 will be given. The backlight 400 is, for example, usable in the display device 200 described above. The backlight 400 comprises a first light source 418 and a second light source 419. The light sources 418, 419 emit unpolarized light into a birefringent lightguide 402, which is arranged on top of an optically isotropic layer 404. The lightguide 402 is configured with a plurality of asymmetric, with respect to a line 409 along a direction y, V-shaped parallel grooves 406. The grooves 406 have a width and depth that in combination defines a groove angle 408. Light emanating from the first light source 418 is exemplified by a first light path 430 and a second light path 432. Light emanating from the second light source 419 is exemplified by a third light path 434 and a fourth light path 434. As in the example described above in connection with FIG. 3, the light sources 418, 419 may be operated continuously or alternating at high frequency, i.e. high enough not to be noticed by the human. eye.

Figure 3:
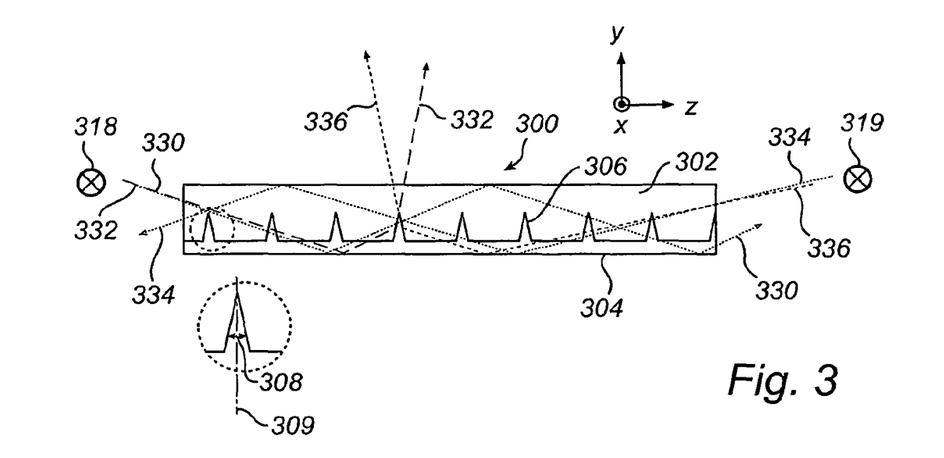
FIG. 3 illustrates schematically a cross-section of a backlight, with symmetric grooves, used in a preferred embodiment of the present invention.
Figure 4:
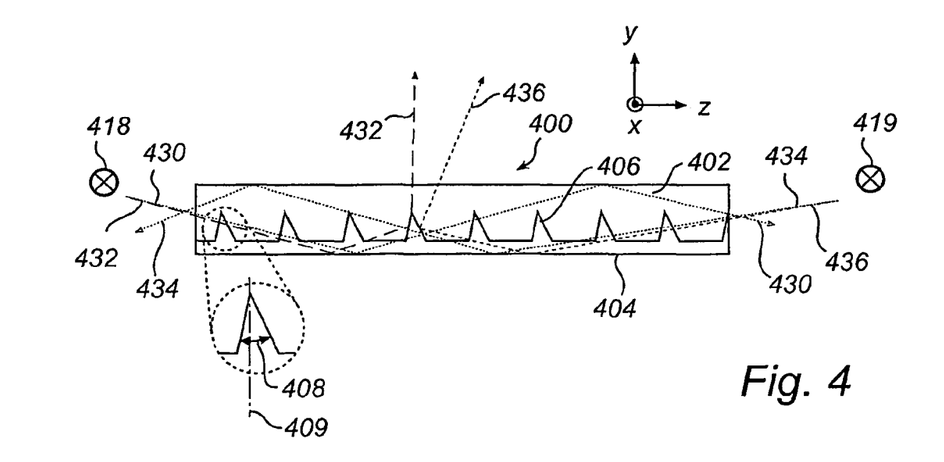
FIG. 4 illustrates schematically a cross-section of a backlight, with asymmetric grooves, used in a preferred embodiment of the present invention.

It is to be noted that, in comparison with the embodiment in FIG. 3, the grooves 406 are asymmetric. This has the resulting effect that, in comparison with the situation in FIG. 3, light along the second light path 432 emanate from the backlight 400 more or less in the y-direction and light along the fourth light path 436 emanate from the backlight 400 more towards the z-direction. This is advantageous in that, for a viewer viewing in the direction -y, i.e. directly in front of and in a perpendicular direction with respect to the display, the groove shape can be said to be optimised for a 2D viewing mode.

Hence, the embodiment using asymmetric grooves 406 is preferably utilized in display applications that is primarily intended for 2D applications, while that of the previous embodiment, using symmetric grooves 306, is preferably utilized in display applications that is primarily intended for 3D applications.

The asymmetric groove backlight may also be a preferred solution in situations where a viewer is located in an environment where displays surround him or her, for example in a flight-simulator. Other examples are environments where the viewer is not located immediately in front of the centre of the display, such as in an automobile application where a display typically is located in a centre panel of the automobile compartment.

Figure 5:
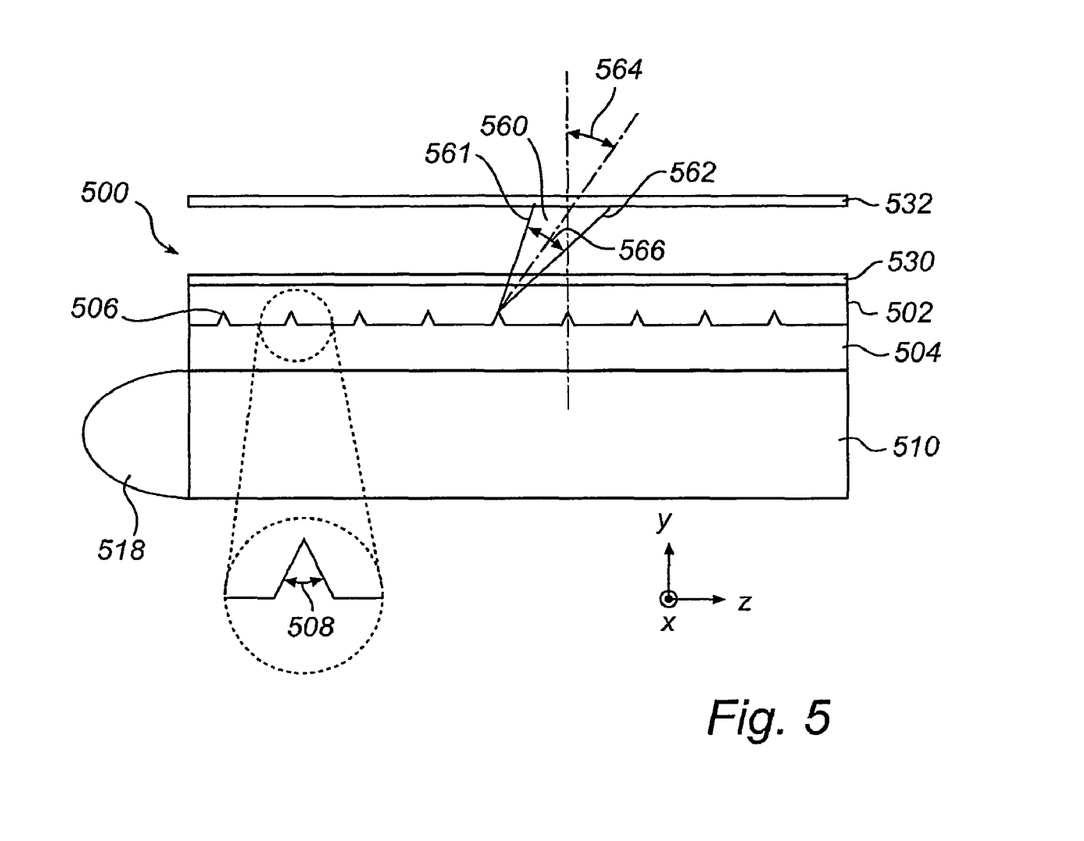
FIG. 5 illustrates schematically a backlight according to the present invention and a detector used in producing computer modelling results.
Figure 6:
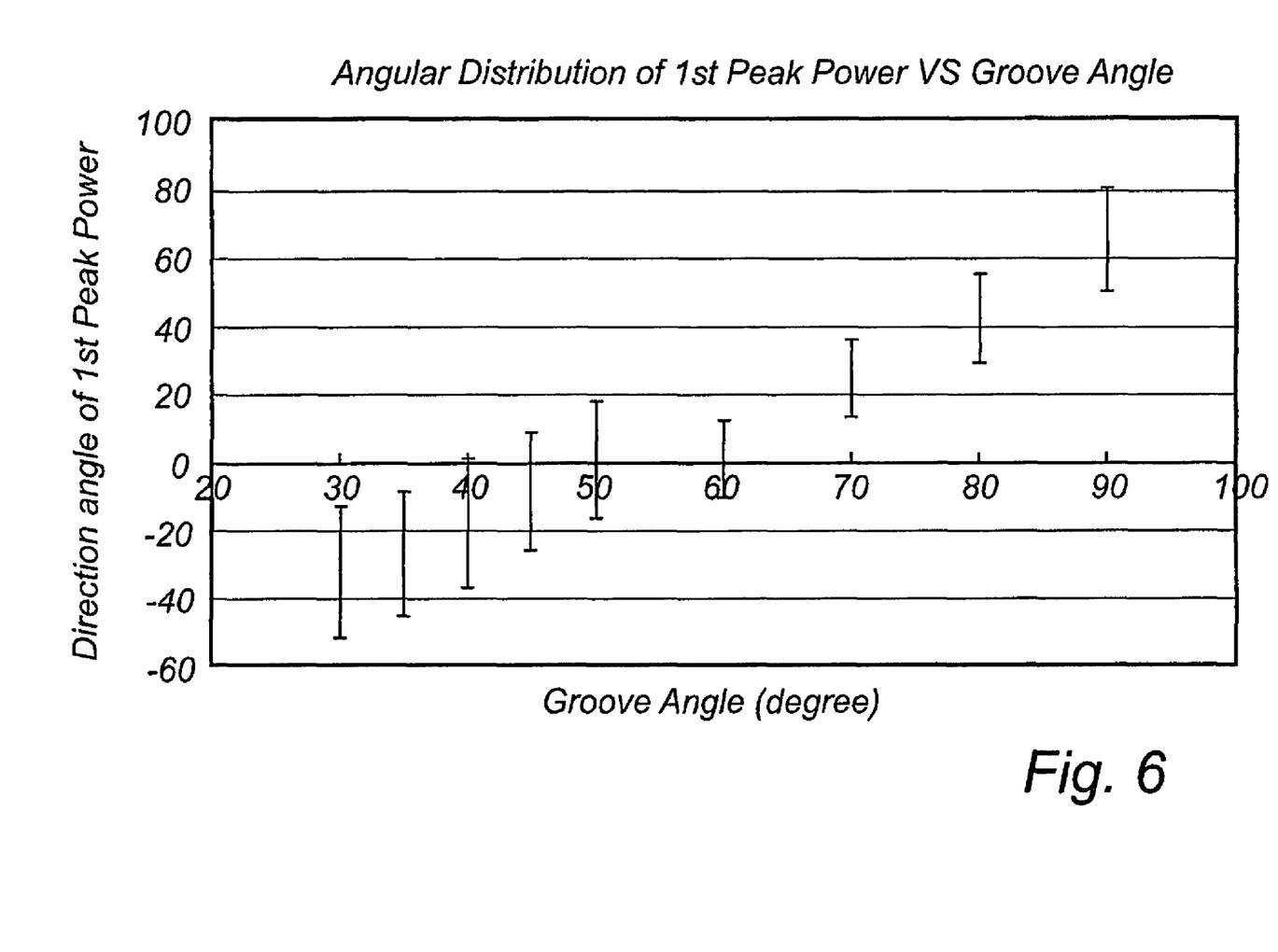
FIG. 6 is a diagram presenting a first set of computer modelling results using the backlight of FIG. 5.
Figure 7:
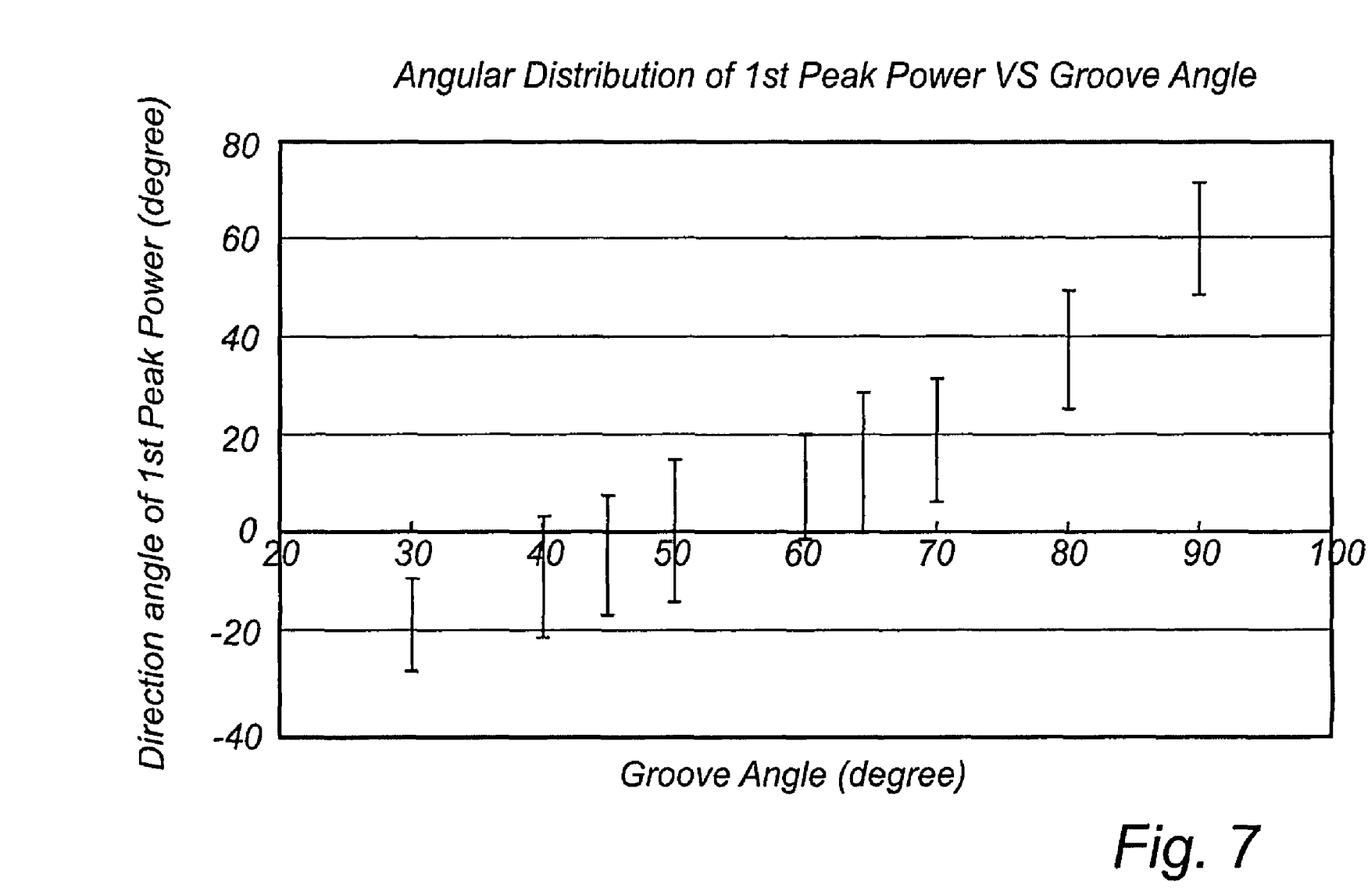
FIG. 7 is a diagram presenting a second set of computer modelling results using the backlight of FIG. 5.

Computer modelling results that illustrate the groove angle dependence of emitted beams of polarized light will now be presented with reference to FIGS. 5 to 7. FIG. 5 illustrates schematically a cross-sectional view of a backlight system 500. Similar to the system illustrated in FIG. 1, the system 500 comprises a lightguide 510 on which is located an optically isotropic material 504 and a layer of birefringent, i.e. optically anisotropic, material 502. The birefringent layer 502 comprises parallel grooves 506 extending in the x-direction. The grooves 506 have widths and depths that define a groove angle 508. A light source 518 emits light into the lightguide 510 and the emitted light is subject to internal reflections as discussed above and result in light beams 560 that are emitted, via a polarizing layer 530, out of the backlight and onto a light detector 532. The polarizing layer 530 is configured such that only S-polarized light passes through. The beams of light 560 have spatial ranges as defined by a first beam edge 561 and a second beam edge 562. A beam width is defined by an angle 566 and a beam direction angle 564 is defined with reference to an y-axis.

Results from a first computer modelling are presented in FIG. 6. Here, the computer modelling set-up is such that the refractive index of the lightguide 510 is 1.49 and the refractive index of the coating layer 504 is 1.56. The grooved birefringent layer 502 I a PEN-foil having refractive indices $n_o$=1.56 and $n_e$=1.86. The depth of the grooves 506 is 56.5 μm, the groove pitch is 200 μm and the groove angle is varied between 30 and 90 degrees.

The diagram in FIG. 6 illustrates the angular distribution of the beams of light 560 when detected by the detector 532, as a function of groove angle 508. That is, both directional angle 564 and beam width 566 can be seen in the diagram.

It can be read from the figure that for a groove angle of 30, 35 or 40 degrees, the light will be extracted with negative angles, for instance to form the image in the right eye of the observer. If the groove angle is 65 degrees or higher, the light is extracted with positive angles to form the image in the left eye of the observer.

Results from a second computer modelling experiment are presented in FIG. 7. Here, the computer modelling set-up is such that the refractive index of the lightguide 510 is 1.49 and the refractive index of the coating layer 504 is 1.53. The grooved birefringent layer 502 I a PET-foil having refractive indices $n_o$=1.53 and $n_e$=1.71. The depth of the grooves 506 is 56.5 μm, the groove pitch is 200 μm and the groove angle is varied between 30 and 90 degrees.

The diagram in FIG. 7 illustrates the angular distribution of the beams of light 560 when detected by the detector 532, as a function of groove angle 508. That is, both directional angle 564 and beam width 566 can be seen in the diagram.

It can be read from the figure that for a groove angle of 30, 35 or 40 degrees, the light will be extracted with negative angles, for instance to form the image in the right eye of the observer. If the groove angle is 60 degrees or higher, the light is extracted with positive angles to form the image in the left eye of the observer.

Although the embodiments of the invention described above all show a birefringent second layer, or a birefringent joined first and second layer, it is possible to modify these embodiments by replacing the birefringent layer with an isotropic layer having a high refractive index.

That is, by using an isotropic material having a uniform high index of refraction (preferably greater than or equal to 1.7) the angular distributions of the light are the same as described for the embodiments having a birefringent layer. An advantage of using an isotropic layer having a high index of refraction is that it is more easy to fabricate. For example, the micro-structure can be made in a conventional polymer like PMMA, and the high-index material is used subsequently to planarize the micro-structure. Examples of such high-refractive index materials are transparent polyimides and TiO2-nanoparticle-filled polymers.

The invention claimed is:

1. A display device configured to provide two-dimensional and three-dimensional perception, comprising:
    a display panel displaying light,
    a backlight arrangement emitting light towards the display panel, and
    control circuitry controlling the display panel,
    where said backlight arrangement comprises:
        a light source arrangement comprising a first light source and a second light source;
    an optically clear lightguide having:
        a first side face for coupling into the lightguide light from the first light source traveling in a first direction within the lightguide,
        a second side face, opposite the first the side face, for coupling into the lightguide light from the second light source traveling in a second direction, opposite the first direction within the lightguide;
        an exit surface via which light coupled into the lightguide is coupled out of the lightguide; and
        a relief-structured polarization-selective beam-splitting interface configured to split-off from the light traveling in the first direction, a first beam of first polarization and redirect said first beam to have said first beam exit the exit surface at a first angle and to split-off from the light traveling in the second direction, a second beam of light of first polarization and redirect said second beam to have said second beam exit the exit surface at a second angle different from the first angle; and
        where the control circuitry is configured to provide the three-dimensional perception using the first and the second beam.

2. A display device as claimed in claim 1 where said backlight arrangement further comprises:
    a first layer forming the optically clear lightguide, a second layer and a third layer, where at least one interfacing surface between any two of said layers comprises the relief-structured polarization-selective beam-splitting interface in the form of a plurality of essentially parallel structures extending in a direction of extension essentially perpendicular to the first and the second direction.

3. The display device according to claim 2, wherein the second layer is birefringent.

4. The display device according to claim 2, wherein the second layer has a refractive index that is higher than the refractive indices of the first layer and the third layer.

5. The display device according to claim 2, wherein the first layer and the second layer is joined into a single layer.

6. The display device according to claim 5, wherein the second layer has a refractive index that is higher than the refractive indices of the third layer.

7. The display device according to claim 1, wherein the relief structure comprises grooves extending into the relief-structured surface.

8. The display device according to claim 7, wherein a cross-section of the grooves is symmetric with respect to a direction perpendicular to the direction of extension of the grooves.

9. The display device according to claim 7, wherein a cross-section of the grooves is triangular in shape.

10. The display device according to claim 3, where the birefringent layer comprises a PolyEthyleneNaphthalate (PEN) foil.

11. The display device according to claim 3, where the birefringent layer comprises a PolyEthyleneTerephthalate (PET) foil.

12. The display device according to claim 9, where a width and a depth of the grooves define a groove angle and where the groove angle is in the interval 30° to 90°.

13. The display device according to claim 12, where the groove angle is in the interval 30° to 70°.

14. A method of controlling a display device according to claim 1, comprising:
    controlling the light coupling into the light guide via the first and second side face to be continuous in time.

15. A method of controlling a display device according to claim 1, comprising:
    controlling the light coupling into the light guide via the first and second side face such that light incoupling is alternate between the first and second side face at an alternation rate high enough not to be perceivable by a human viewer.

* * * * *